United States Patent
Li et al.

(10) Patent No.: US 8,438,417 B2
(45) Date of Patent: May 7, 2013

(54) METHOD AND APPARATUS TO SIMPLIFY HA SOLUTION CONFIGURATION IN DEPLOYMENT MODEL

(75) Inventors: Ying Li, Beijing (CN); Jing Luo, Beijing (CN); John Arthur Pershing, Jr., Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/916,494

(22) Filed: Oct. 30, 2010

(65) Prior Publication Data

US 2011/0138218 A1   Jun. 9, 2011

(51) Int. Cl.
*G06F 11/00* (2006.01)

(52) U.S. Cl.
USPC .......... 714/1; 714/4.11; 714/4.3; 714/25; 714/26; 714/47.1

(58) Field of Classification Search .......... 714/1, 4.11, 714/4.3, 25, 26, 44, 47.1
See application file for complete search history.

(56) References Cited

U.S. PATENT DOCUMENTS

| 7,788,544 B2* | 8/2010 | Allen et al. ................. 714/47.1 |
| 8,195,760 B2* | 6/2012 | Lacapra et al. .............. 709/214 |
| 8,209,417 B2* | 6/2012 | Kakarla et al. .............. 709/226 |
| 2007/0226333 A1* | 9/2007 | Morich et al. ............... 709/224 |
| 2008/0222642 A1* | 9/2008 | Kakarla et al. .............. 718/104 |
| 2011/0083046 A1* | 4/2011 | Andrade et al. ............. 714/47.1 |
| 2012/0036161 A1* | 2/2012 | Lacapra et al. .............. 707/781 |

\* cited by examiner

*Primary Examiner* — Charles Ehne
(74) *Attorney, Agent, or Firm* — Gail H. Zarick; Anne Vachon Dougherty

(57) ABSTRACT

A method, device and system for generating an HA group according to a user's HA requirement by retrieving an applicable HA pattern, according to a result of HA requirement analysis on the user's HA requirement; generating an initial HA group based on the retrieved HA pattern; performing context rebuilding on a member unit in the initial HA group to obtain a preliminarily configured HA group; generating a member unit based HA group variant for the preliminarily configured HA group according to an HA group redundancy obtained from the user's HA requirement; and performing structure configuration and attribute configuration on a member unit in the generated HA group variant to obtain an HA group that meets the user's HA requirement.

15 Claims, 12 Drawing Sheets

METHOD AND APPARATUS TO SIMPLIFY HA SOLUTION CONFIGURATION IN DEPLOYMENT MODEL

FIELD OF THE INVENTION

The present invention generally relates to a Service-Oriented Architecture (SOA) development framework in the Information Technology (IT) field, and in particular, to the plan, deployment and configuration of High Availability (HA) solutions in the SOA development framework.

BACKGROUND OF THE INVENTION

Nowadays, as more and more enterprises' businesses are supported and automated by IT, a highly available enterprise IT infrastructure becomes critically important, because companies cannot afford to have unexpected downtime, especially for those critical businesses. Downtime will not only cause unbearable revenue loss and customer dissatisfaction, but also may lead to a seriously damaged reputation and even business closure. For example, taking an online B2C (Business-to-Consumer e-commerce model) book trade system, such as Amazon as an example, when the system is crashed, the company will lose potential revenue during the downtime, and more seriously, the customers' frustration experience of unavailable business services may lead to customer satisfaction issues, customer loss, and even brand reputation damages. Therefore, to ensure business service availability, high availability of IT infrastructure is the guarantee. Usually, highly available IT infrastructure is achieved by redundancy-based HA solutions, which, from an IT management perspective, are the primary availability measures. A redundancy-based HA solution provides customers with continual services by failover of critical data and applications from a crashed IT system to another peer system, thus reducing the service downtime and the corresponding loss.

Redundancy-based HA solutions are essential building blocks of a highly available IT infrastructure. However, they are expensive due to the redundant IT resources required and complex, since multiple IT systems should be cross configured. Thus, how these solutions can be effectively planned and implemented in the IT infrastructure becomes critically important. Traditionally, business people firstly specify the availability requirement for each business service, and then an IT architect or even an HA expert figures out where and how HA solutions should be applied; after the HA architecture is set down, IT operators will configure and provision the specific HA solutions following the architecture decisions. However, the traditional plan and implementation scenario of such HA solutions are experience-based and highly expertise intensive, which further results in high IT resource and operational costs.

A challenge now faced is how to automate the design, plan, deployment and configuration of specific HA solutions according to the architecture decisions. Traditionally, these activities are manually implemented. For example, if the HA architecture tries to apply an HA solution to a DB2 database, usually, there are several HA solutions that can be applied, such as HADR (High Availability Disaster Recovery) and hot standby, where the DB2 Database file is located at a shared storage and is accessible by two DB2 instances. IT operators must first select a specific solution, which requires the understanding and trade-off among these HA solutions, and is usually difficult for those IT operators with little HA knowledge. Moreover, even if a specific HA solution is selected, it is still a complicated work to configure and provision such a specific HA solution, because a specific HA solution usually involves complex configurations across multiple IT resources and many interdependencies and constraints, to make sure the solution can work correctly and in an optimized way. For example, configuring a DB2 HADR solution involves a primary OS (Operating System), a primary DB2 instance, a primary database, a standby OS, a standby DB2 instance and a standby database, and these cross-component configurations should satisfy more than 50 constraints. Thus, if these activities are performed manually, it would be quite labor intensive, error-prone and highly expertise dependent, which may further result in high IT operational cost.

SUMMARY OF THE INVENTION

To provide a basic understanding of some aspects of the present invention, a brief summary of the invention is given hereinafter. It should be noted that the summary is not exhaustive. It is not intended to determine a key or an important part of the invention, nor is it intended to define the scope of the invention. The purpose of the summary is merely to give some concepts in a simplified manner, serving as a preface to the more detailed description of the subsequent discussion.

To solve the problems above mentioned in the prior art, an object of the invention is to provide a method, a device and a system for generating an HA group according to a user's HA requirement, which can at least partially resolve the above drawbacks existing in the prior art.

To achieve the above object, according to an aspect of the invention, a method for generating an HA group according to a user's HA requirement is provided, including: retrieving an applicable HA pattern, according to a result of HA requirement analysis on the user's HA requirement; generating an initial HA group based on the retrieved HA pattern; performing context rebuilding on a member unit in the initial HA group to obtain a preliminarily configured HA group; generating a member unit based HA group variant for the preliminarily configured HA group, according to an HA group redundancy obtainable from the user's HA requirement; and performing structure configuration and attribute configuration on a member unit in the generated HA group variant to obtain an HA group that meets the user's HA requirement.

According to another aspect of the invention, a device for generating an HA group according to a user's HA requirement is further provided, including: an HA pattern retrieving means, adapted to retrieve an applicable HA pattern, according to a result of HA requirement analysis on the user's HA requirement; an initial HA group generating means, adapted to generate an initial HA group based on the retrieved HA pattern; a context rebuilding means, adapted to perform context rebuilding on a member unit in the initial HA group, to obtain a preliminarily configured HA group; an HA group variant generating means, adapted to generate a member unit based HA group variant for the preliminarily configured HA group according to an HA group redundancy obtainable from the user's HA requirement; and a configuration means, adapted to perform structure configuration and attribute configuration on a member unit in the generated HA group variant to obtain an HA group that meets the user's HA requirement.

According to another aspect of the invention, a system for generating an HA group according to a user's HA requirement is further provided, including: an HA requirement analyzing means, adapted to perform HA requirement analysis on the user's HA requirement; the device described above for generating an HA group according to the user's HA requirement; and an HA pattern repository where a plurality of applicable HA patterns are pre-stored.

According to other aspects of the invention, corresponding computer-readable storage medium and computer program product are also provided.

The invention is advantageous in that, by using the method, device and/or system according to the invention for generating an HA group according to a user's HA requirement, the complexity of the HA group configuration can be reduced, and the design, plan, deployment and configuration of the HA group can be automated, thereby lowering the cost.

These and other advantages of the invention will be more apparent by the detailed description below of the preferred embodiments of the invention in conjunction with the accompanying drawings.

BRIEF DESCRIPTION OF THE DRAWINGS

The invention can be better understood from the following description taken in conjunction with the accompanying drawings, in which identical or corresponding reference signs are used to denote identical or corresponding components. The accompanying drawings together with the following description are included in this specification to form a part of the specification and are used to further illustrate the preferred embodiments of the invention and the principle and advantages of the invention by way of example. In the accompanying drawings.

Figure 1:
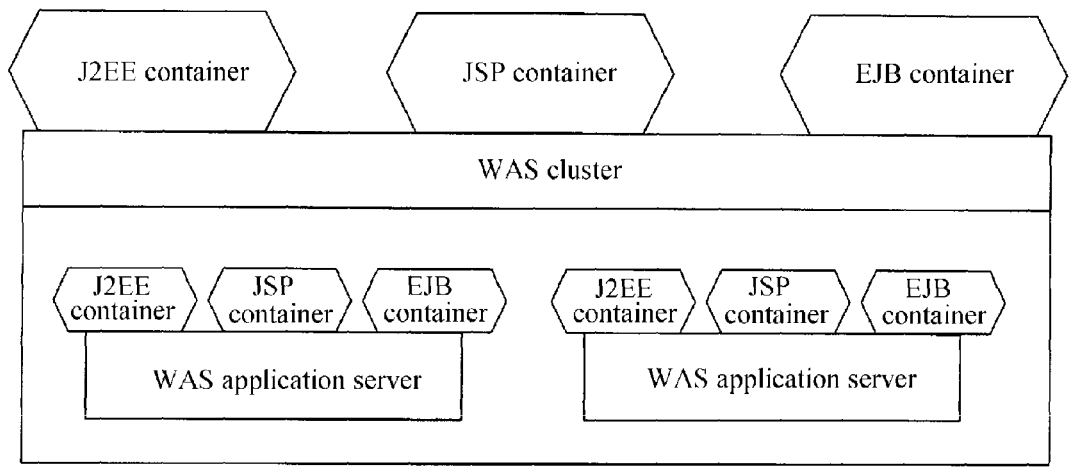
FIG. 1 and FIG. 2 illustrate two types of single system views (i.e., the single system view of SSI (Single System Image) cluster and the single system view of HA failover group) of HA groups for representing HA solutions, respectively.

It should be understood by those skilled in the art that, the elements in the figures are shown merely for the purpose of simplifying and clarifying, and are not necessarily drawn in scale. For example, the size for some of the elements in the figures may be enlarged compared with other elements, to facilitate the understanding of the embodiments of the invention.

DETAILED DESCRIPTION OF THE INVENTION

The exemplary embodiments of the invention will be described in conjunction with the accompanying drawings hereinafter. For clarity and simplicity, not all the characteristics of practical embodiments are described in the specification. However, it should be appreciated that, in order to realize a particular object of the developers, many embodiment-specific decisions have to be made during the developing of any practical embodiments, e.g., to comply with those system or business associated restraints that may be variable according to the embodiments. Furthermore, it should also be appreciated that although the development may be complex and time-consuming, it is simply a routine for those skilled in the art benefiting from the disclosure.

Herein, another point still to be noted is that, only the means, structures and/or processing steps that are closely related to the technical solutions of the invention are shown in the figures, with other details remotely related to the invention omitted, so that the invention would not be obscured by unnecessary details.

Prior to the description of the embodiments of the invention with reference to the figures, some related technical terms and backgrounds are briefly described below at first, for the convenience of understanding.

To improve the high reliability capability of IT resources, redundancy-based HA systems are the primary measures, which achieve high availability by failover of the failed IT component to its workable peers.

The redundancy-based HA solutions may be categorized into active-active mode and active-passive mode, with corresponding generic HA patterns as HACluster and FailoverGroup, respectively. In the HA solution of active-active mode, two or more peer active nodes can process requests respectively; if one of the nodes fails, another peer active node will take over the client requests at the failed node for continual processing. A typical example is the application server cluster. In the HA solution of active-passive mode, some active nodes are used to process client requests while some other nodes stand by. If an active node fails, a standby node is activated to accept requests sent to the failed active node. Such a typical example is DB2 HADR.

After extensive investigation and analysis, it has been observed that HA solutions have shared characteristics. First, most HA solutions try to provide a single system view for its hosting applications. Taking the application server cluster as an example, from the application level, it can be considered as a single application server rather than several interconnected application servers.

Second, an HA solution should be able to provide the following generic functionalities:

(1) State/Data synchronization/sharing. In a redundancy-based HA system, if a peer component can take over the workload from the failed component, it should be able to recover or rebuild the context for the request taken over. Synchronization and sharing are usually for this purpose.

(2) Failure detection. In a redundancy-based HA system, a monitoring mechanism should be used to detect whether the active node fails, so that the peer node can start the takeover process. Usually, heartbeat is a widely used monitoring mechanism.

(3) Failover. When data/state are synchronized and the failure can be detected, the peer node still should be able to automatically take over the requests from the failed node. Front-end workload redirection is such a frequently used mechanism. Meanwhile, additional HA software may be installed and configured to provide this capability.

Based on the observations above, a new modeling mechanism HAGroup is defined to represent an HA solution, which groups a number of homogenous or heterogeneous member units to provide a single system view of the HA solution. As for the number of members that can be grouped with HAGroup, a cardinality mechanism is introduced to constrain the upper bound and lower bound. The cardinality mechanism is defined as a range constraint attached to the HA group. For example, [2, 16] indicates that the number of members in the HA group should be more than 1 and fewer than 17.

From the perspective of hosting IT components and dependent IT components, an HA solution can be modeled as a system that can be represented by a single system view (also can be referred to as "a single view system" in short) with an HAGroup mechanism. As for the single system view, an HA group should have the capability of its specific IT component members (also can be referred to as "member units" or "members" in short). Therefore, to obtain the single system view of the HA group (also can be referred to as "HA single system view" in short), a capability move-up mechanism is introduced to create functional capability elements of the IT component members for the HA group (i.e., moving up the functional capability elements of the IT component members to the HA group), so that the HA group can be viewed as a single view system as its member IT components. Taking the cluster HA group constituted by a number of application servers as an example, the capability elements of the application servers are moved up to the cluster HA group. Thus, the cluster HA group can host applications as an application server.

However, for more complex scenarios where an HA group may contain similar members of different types, the move up mechanism cannot directly create the capability elements of the members and attach them to the HA group, because the capability elements vary with different member types. In this situation, e.g., an additional super-type capability move up mechanism may be introduced. It creates common super-type capability elements of the members (detailed description will be given hereinafter), and attaches them to the HA group, so that the super-type capability elements common to the member units in the HA group are moved up to the HA group. In the modeling type system, certain relationships exist among different types, wherein inheritance is one of the relationships representing the inheriting type that has all the characteristics of the inherited type. Herein, in the type system, a super-type found to be common to multiple capability elements of the member units is referred as a common super-type. If it is determined that, for a certain type, each of the member units in the HA group has a corresponding super-type capability element, then the super-type capability move-up mechanism considers the certain type as the common super-type capability element of the member units in the HA group (detailed description will be given hereinafter in conjunction with examples).

The HA group can be represented as a single view system and move up a capability element of a specific IT component member to the HA group and, further, the HA group should have its own capability elements while represented in the single system view. As discussed above, a complete HA solution should have the capabilities of performing data/state synchronization, resource monitoring and failure detection, and automatic failover. Therefore, in order to represent the capabilities of an HA solution, new capability elements should be modeled and provided. Currently, three main HA capability elements are provided: a synchronization capability element, a detection capability element, and a failover capability element.

Depending on whether the HA pattern is an HA cluster pattern or a failover group pattern, the single system view of the HA group (single system view, in short) may be categorized into two typical types: the single system view of a Single System Image (SSI) Cluster, and the single system view of an HA Failover Group.

Particularly, SSI clusters are for the development of specified resource clusters. For example, due to the availability purpose, a client may expect to develop a cluster configured from "identical" resources, and the applications dependent on these resources do not expect to (directly) deal with the diversity of the resources in the cluster. Therefore, in an SSI cluster, all the resources are identical (i.e., homogeneous), and a capability element of the resources may be specified to the cluster as a conceptual capability element. Here, the conceptual capability element is equivalent to an interface without any actual capabilities, and has to be realized with appropriate techniques such as a load balancer, e.g., a sprayer. In HA solutions, the load balancers usually play the role of agents, such that the services provided by the HA group are requested from the external elements. For more information about the load balancers, please refer to the documents: "Server Load Balancing" by Tony Bourke (published by O'Reilly, ISBN 0-596-00050-2); "Load Balancing Servers, Firewalls & Caches" by Chandra Kopparapu (published by Wiley, ISBN 0-471-41550-2); "Windows Server 2003 Clustering & Load Balancing" by Robert J. Shimonski (published by Osborne McGraw-Hill, ISBN 0-07-222622-6); "High Performance MySQL" by Jeremy Zawodny and Derek J. Balling (published by O'Reilly, ISBN 0-596-00306-4); "Optimizing Network Performance with Content Switching: Server, Firewall and Cache Load Balancing" by Matthew Syme and Philip Goldie (published by Prentice Hall PTR, ISBN 0-13-101468-5); etc.

The HA failover groups are for providing the HA operations for non-clusterable resources. Most database systems are non-clusterable due to the huge amount of state data reading/writing. Configuring "hot standby" in the failover configuration may improve the availabilities. Applications dependent on the resources do not expect to (directly) deal with the failover configuration. An HA failover group is substantially a combination of a Choice Group and an SSI cluster. Therefore, the HA failover group can be modeled similarly to an SSI Cluster, including attaching the conceptual capability elements to the HA failover group itself. Moreover, as the client is directly oriented to the resource instances of the current activity, the realization of the conceptual capability elements is more similar to a choice group.

Figure 2:
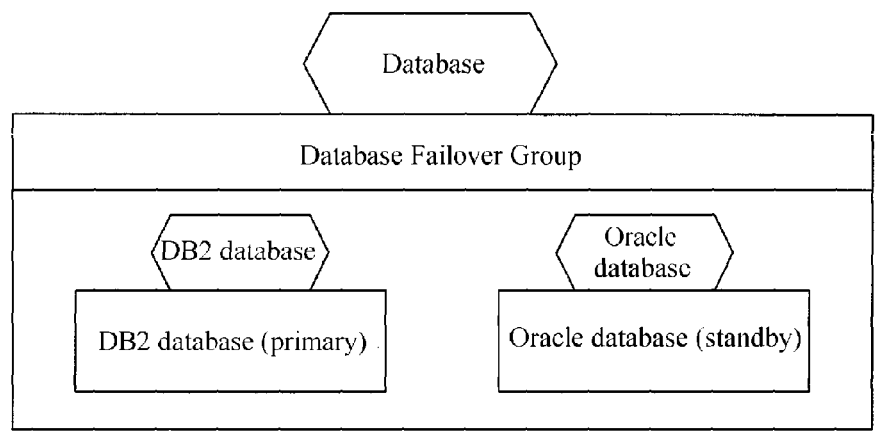

FIG. 1 and FIG. 2 illustrate the single system view of an SSI cluster and the single system view of an HA failover group, respectively.

As shown in FIG. 1, an SSI cluster, illustrated as a WAS cluster in FIG. 1, includes two member units identical to each other, i.e., the WAS application servers shown in FIG. 1. Each of the WAS application servers includes several interfaces for interacting with the outside, such as a J2EE container, a JSP container and an EJB container. The J2EE container, the JSP container and the EJB container are capability elements common to all the WAS application servers. Therefore, they should be moved up to the WAS cluster by means of the capability move up mechanism. Seen as a whole from the outside, the WAS cluster operates as a single WAS application server.

In the example of the single system view of an HA failover group, illustrated as a database failover group shown in FIG. 2, the HA failover group trying to provide HA database services includes two member units: a DB2 database (as the primary active node) and an Oracle database (as a standby node). The DB2 database capability element and the Oracle database capability element are not common to all the member units, and thus should not be attached to the HA group. However, their super-type capability element, i.e., the database capability element, should be attached to the HA failover group by means of the super-type capability move-up mechanism. Seen as a whole from the outside, the database failover group operates as a single database.

In addition, in order to further simplify the configuration of the HA group, two HA pattern transformation mechanisms are provided in the HA pattern framework: UTP (Unit to HA Pattern), and GTS (Generic to Specific).

UTP supports the transformation from one member unit to its applicable HA pattern (either a generic HA pattern or a specific HA pattern), i.e., the transformation from a member unit to an HA group that meets the user's HA requirement and includes the member unit. In the representation of the HA pattern, the applicable unit types have already been defined. Actually, this transformation is based on the integrated HA group configuration, but under the context of applying an HA pattern to an IT component unit. Besides configuration, a special replacement mechanism is also introduced in the transformation. As an HA group can be viewed as a single view system, the HA pattern will directly replace the applicable unit in the deployment topology, and all related relationships of the applicable unit will be configured to the HA group accordingly. With this transformation mechanism, the applying of an HA pattern to a deployment unit is as easy as a replacement operation, requiring little HA knowledge and few HA configurations.

GTS supports the transformation from a generic HA pattern to a specific HA pattern. The motivation of this transformation is that, in the modeling process, if the deployment operator is not sure which specific HA solution is to be used, he may firstly use the generic pattern to plan the HA architecture, and after the specific HA pattern is set down, a further transformation can be performed to complete the specific configuration. This transformation is applicable only when the target-specific HA pattern belongs to the source generic HA pattern category. Similar to UTP, GTS can also be viewed as a replacement operation. However, their applying context and motivations are different.

Figure 3:
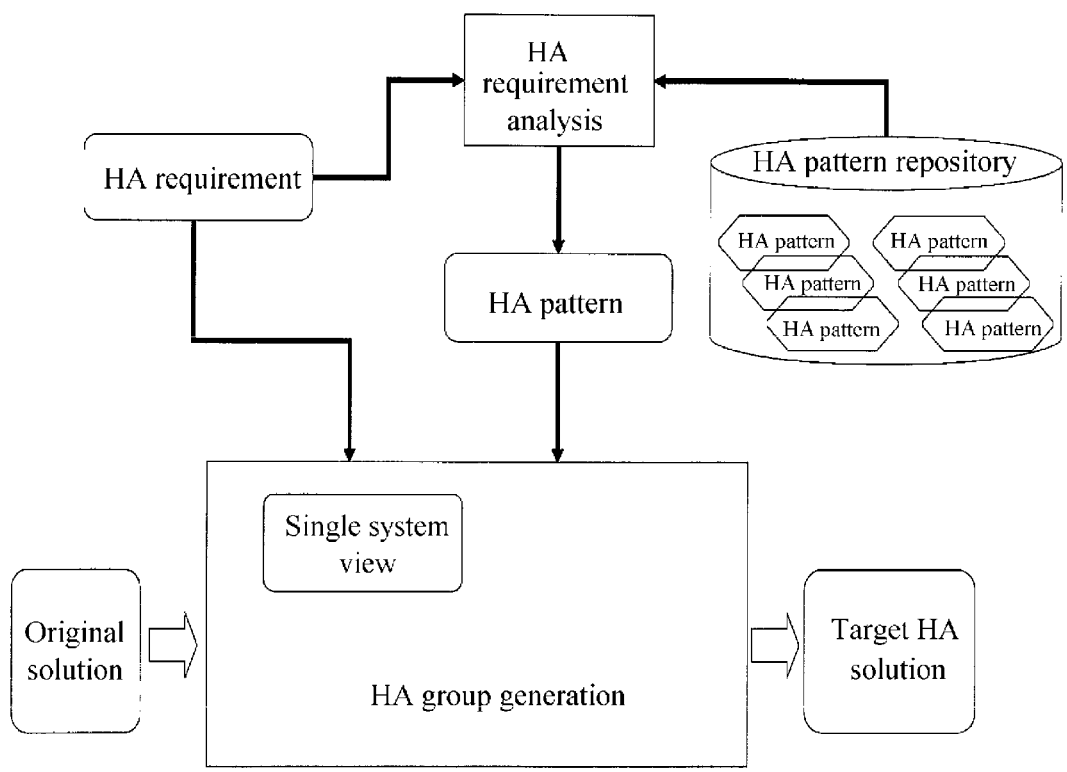
FIG. 3 is a schematic diagram illustrating an application scenario of a method for generating an HA group according to a user's HA requirement according to an embodiment of the invention.
Figure 4:
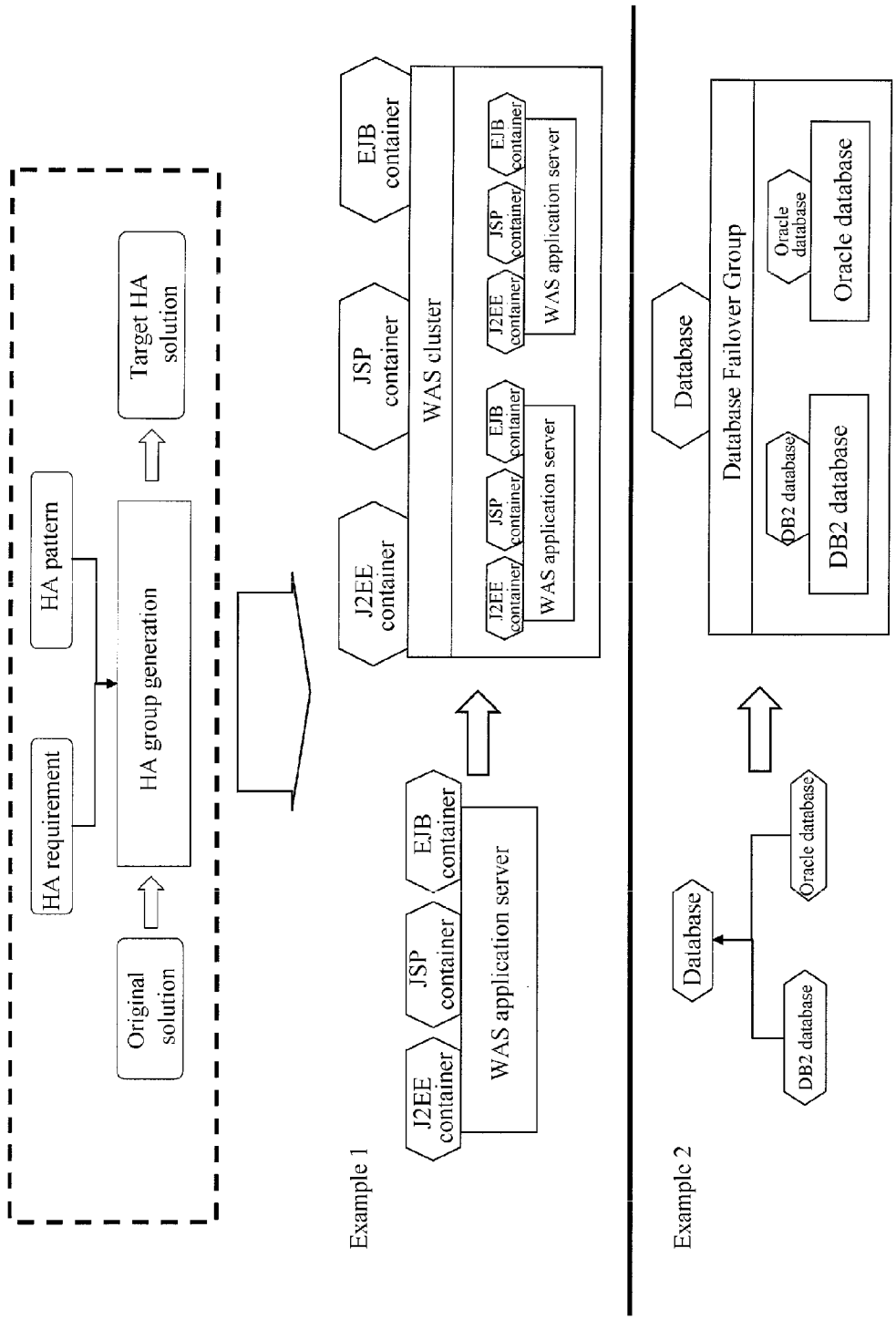
FIG. 4 shows two examples of the single system views of the HA group obtained with a method according to an embodiment of the invention in the application scenario shown in FIG. 3.

The processing procedure of a method for generating an HA group according to a user's HA requirement according to an embodiment of the invention (which can implement the above described UTP and GTS HA pattern transformation mechanisms) is described with reference to FIG. 3 to FIG. 11. FIG. 3 is a schematic diagram illustrating an application scenario of the method for generating an HA group according to a user's HA requirement according to an embodiment of the invention; FIG. 4 shows two examples of the single system views of the HA group obtained according to an embodiment of the invention in the scenario of FIG. 3; and the schematic flowchart of FIG. 5 illustrates the processing of the method 500 for generating an HA group according to a user's HA requirement according to an embodiment of the invention.

As shown in FIG. 3, by using the method for generating an HA group according to a user's (e.g., a system designer) HA requirement according to an embodiment of the invention, an original solution ("as is solution"), e.g., a non-HA solution or a generic HA pattern solution) can be transformed into an HA solution that meets the HA requirement (also can be referred as the "target HA solution"), according to a result of the HA requirement analysis on the HA requirement of the user regarding a desired HA solution (i.e., the HA requirement for an HA group that is desired to be built).

Figure 5:
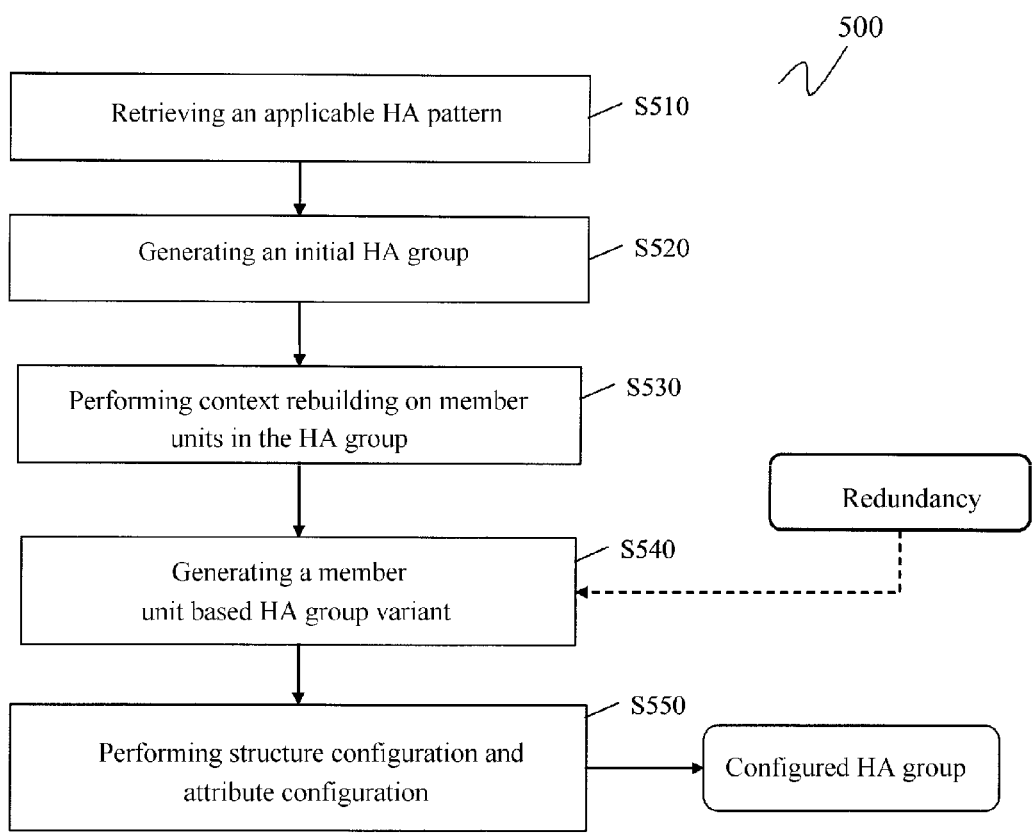
FIG. 5 is a schematic flowchart illustrating a method for generating an HA group according to a user's HA requirement according to an embodiment of the invention.

As shown in FIG. 5, in step S510, an applicable HA pattern is retrieved from e.g., an HA pattern repository where multiple HA patterns are pre-stored, according to a result of HA requirement analysis on the HA requirement of the user. For the details of the HA requirement analysis, please refer to, e.g., "Availability 'Weak Point' Analysis over an SOA Deployment Framework" by Lei Xie, Jing Luo, Jie Qiu, Pershing J. A., Ying Li and Ying Chen (2008 IEEE Network Operations and Management Symposium (NOMS 2008), Vol. 1, Apr. 7-11, 2008, page 473-480).

Then, in step S520, an initial HA group is generated based on the HA pattern retrieved in step S510. As discussed above, an initial SSI cluster or an HA failover group (which is collectively referred as "an initial HA group" here) is generated, depending on whether the retrieved HA pattern is an HA cluster pattern or a failover group pattern. Herein, the generation process of the initial HA group is to simply include the HA group members using the model of the HA group as a container.

For example, depending on different user inputs, the initial HA group may be generated in the following manners: (1) if the user selects a certain resource element in the model chart, which is input by the user during the HA requirement analysis on the HA requirement of the user (cf: "Availability 'Weak Point' Analysis over an SOA Deployment Framework" mentioned above), then this resource element is included as a group member, so as to form the initial HA group; (2) if the user selects several compatible resource elements in the model chart (whether the resource elements are compatible is determined according to a constraint defined in the HA pattern), then these resource elements are included as group members to form the initial HA group; (3) alternatively, the user may create an empty HA group model element in the model chart as the initial HA group.

Next, in step S530, context rebuilding is performed on member units in the initial HA group, to obtain a preliminarily configured HA group. Here, "context" refers to the incoming dependency of a member unit of the HA group. Then, in step S540, a member unit based HA group variant is generated for the preliminarily configured HA group, according to the HA group redundancy obtained from the HA requirement of the user; and in step S550, structure configuration and attribute configuration are performed on the member units in the generated HA group variant (which may be implemented with the structure configuration component and attribute configuration component recorded in the HA pattern as mentioned below), thereby obtaining the desired HA group that meets the user's HA requirement.

For example, example 1 of FIG. 4 shows the single system view of the SSI cluster (as a WAS cluster shown in the figure) obtained using the method above, and example 2 of FIG. 4 shows the single system view of the HA failover group (as a database failover group shown in the figure) obtained using the method above.

Figure 6:
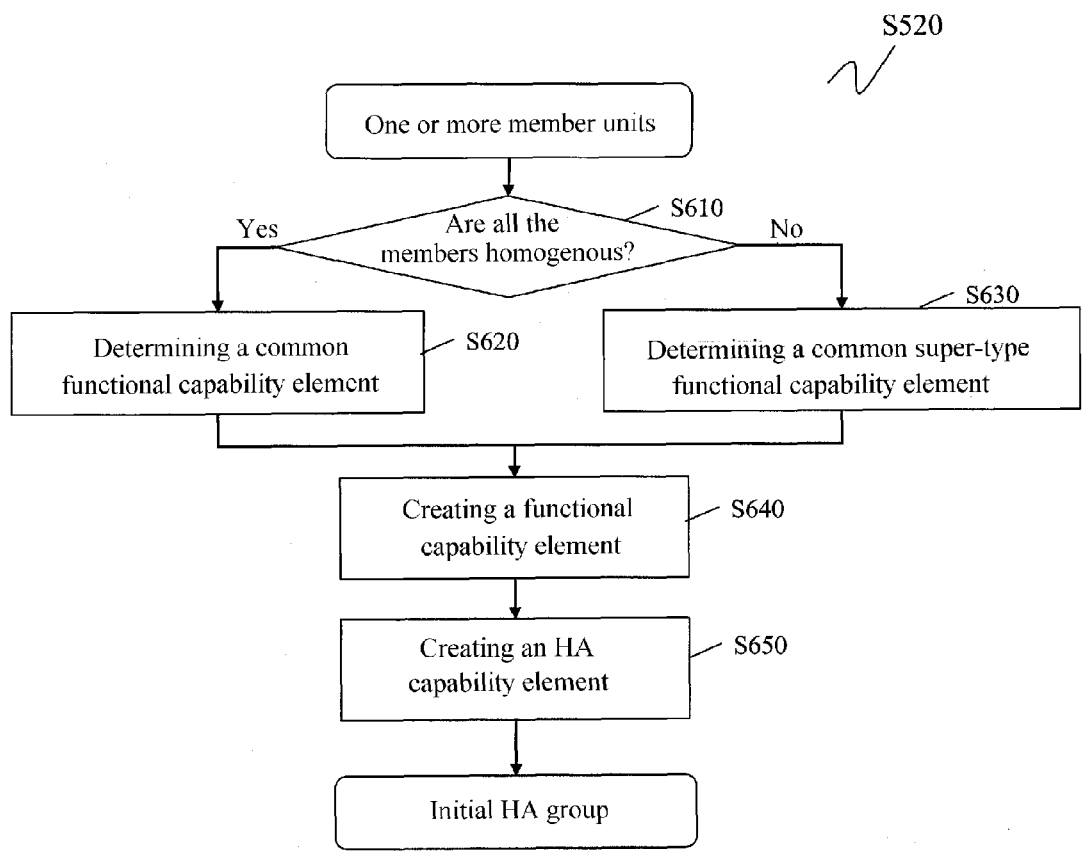
FIG. 6 is a schematic flowchart illustrating the processing for generating an initial HA group in step S520 of FIG. 5.
Figure 7:
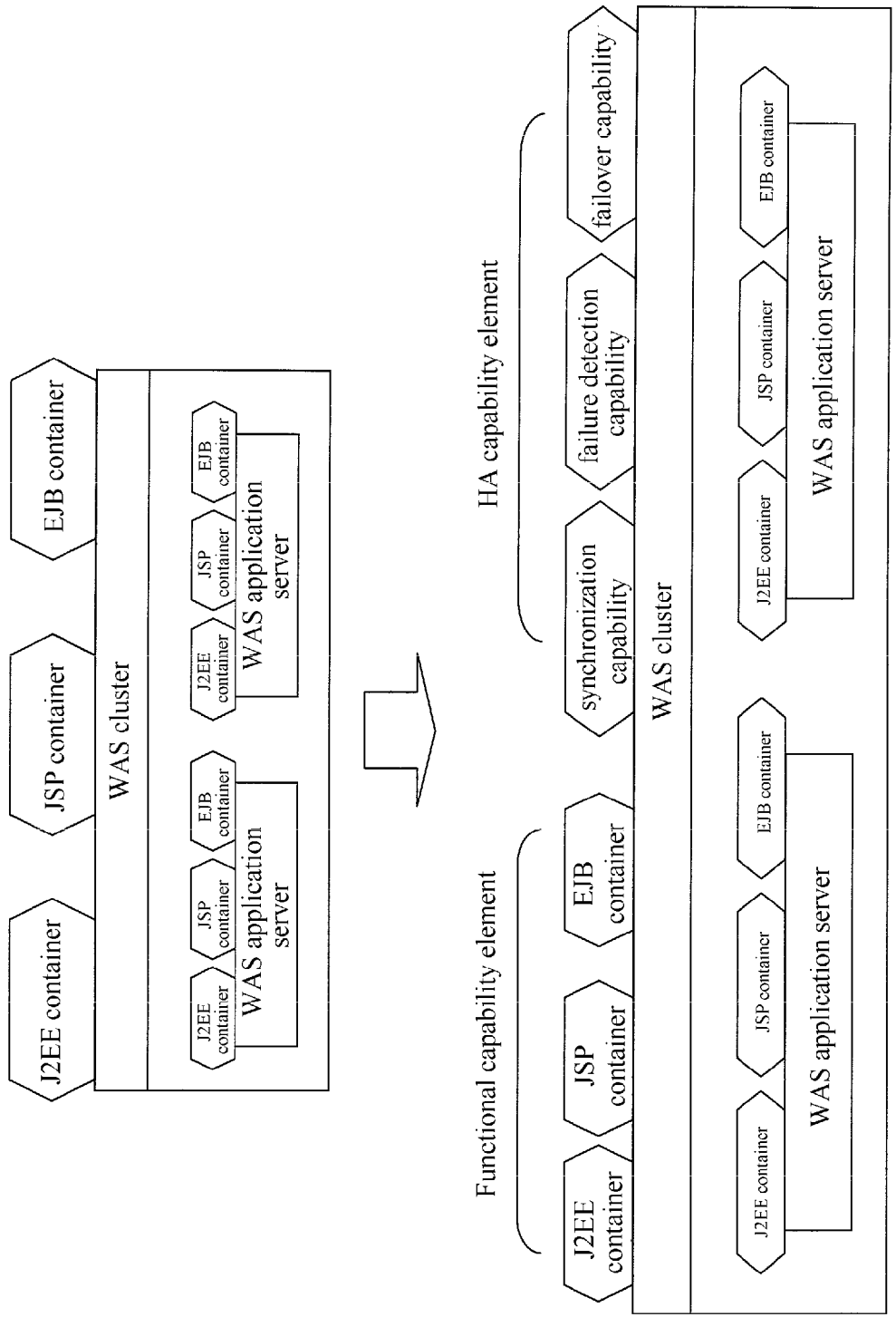
FIG. 7 shows an example of the single system views of the SSI cluster (as a WAS cluster shown in the figure) before and after performing step S650 for creating an HA capability element of FIG. 6.
Figure 8:
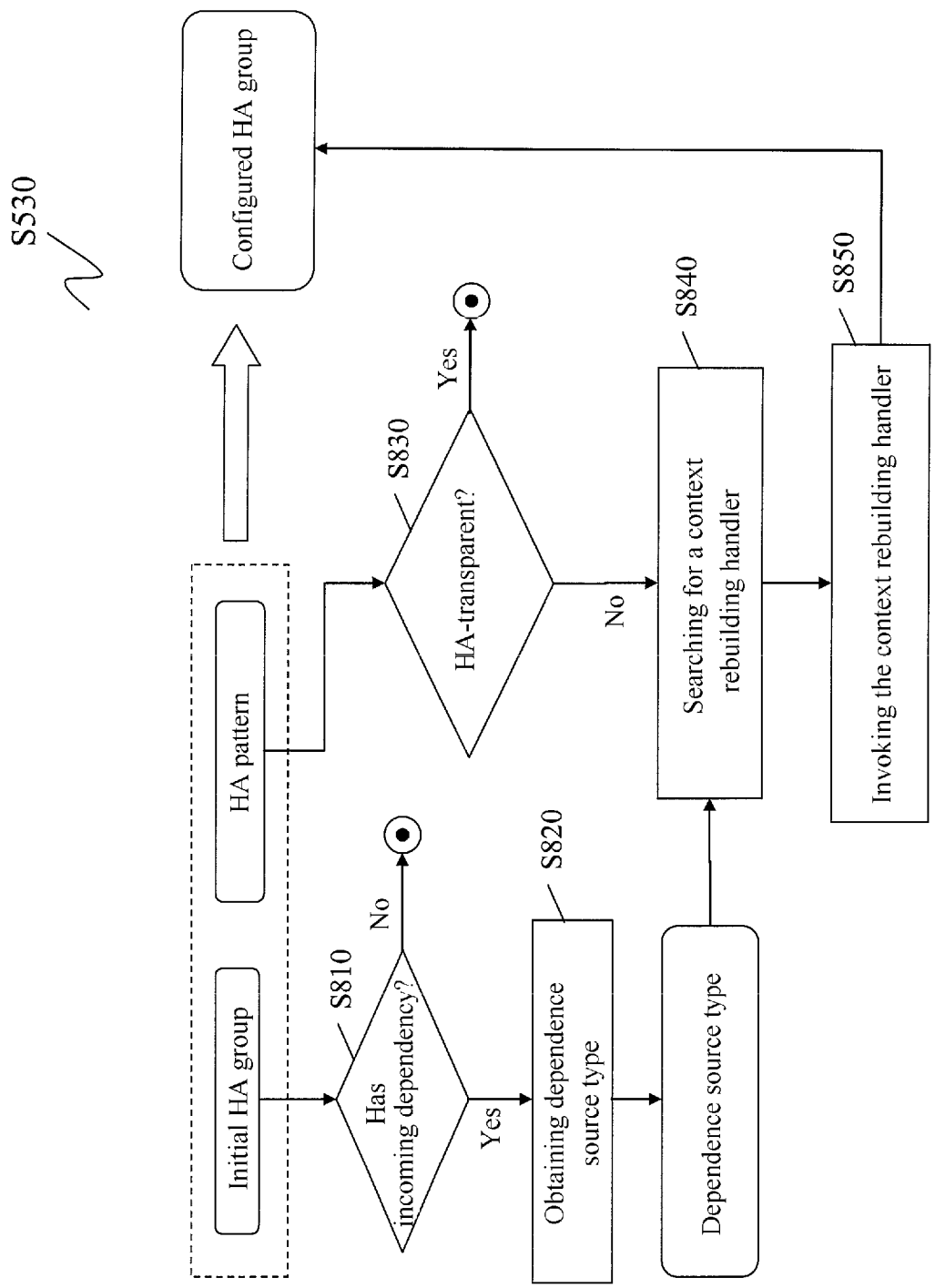
FIG. 8 is a schematic flowchart illustrating the processing for performing context rebuilding of the member unit in the HA group in step S530 of FIG. 5.
Figure 9:
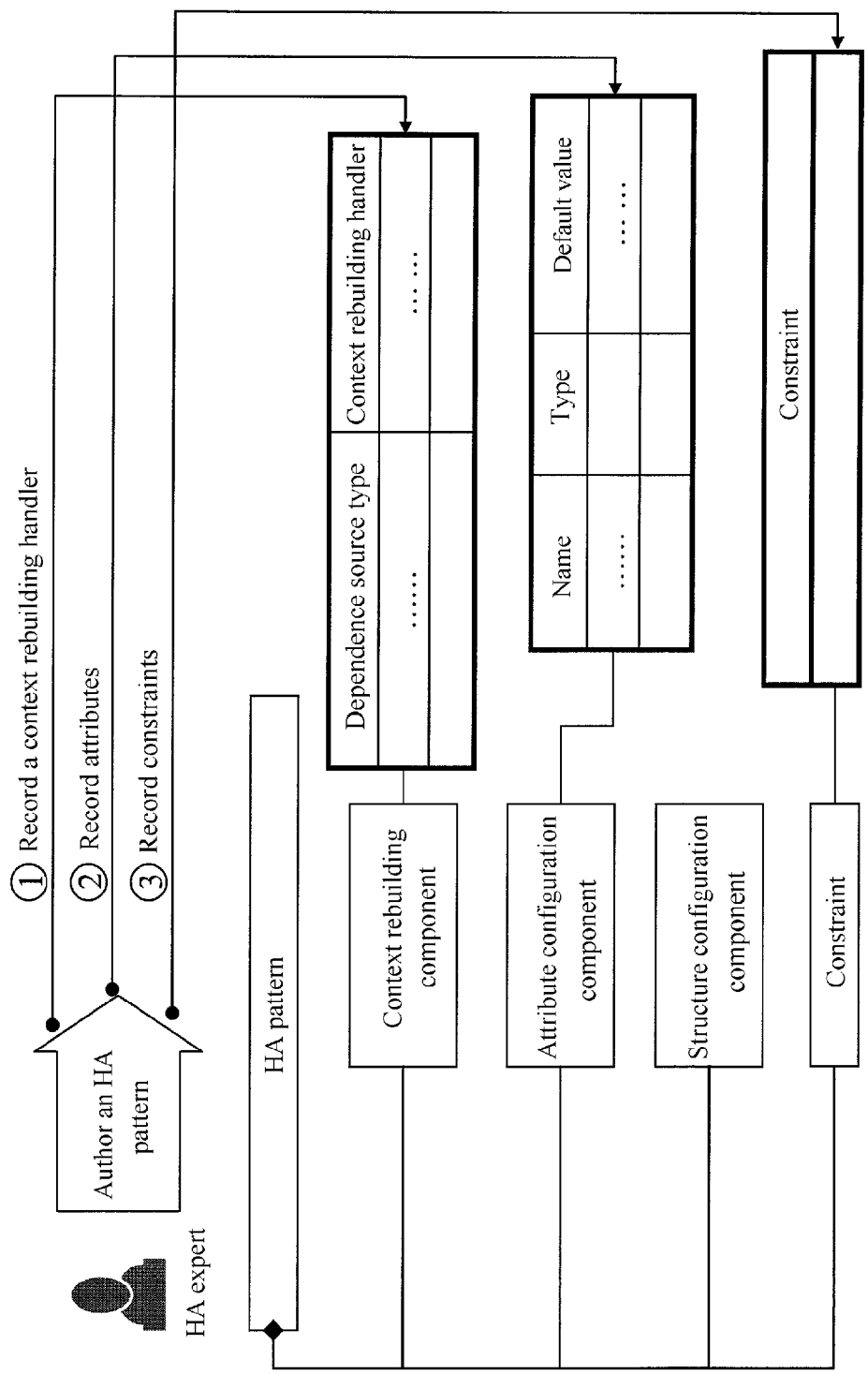
FIG. 9 is a schematic diagram illustrating the process for an HA expert to author an HA pattern.
Figure 10:
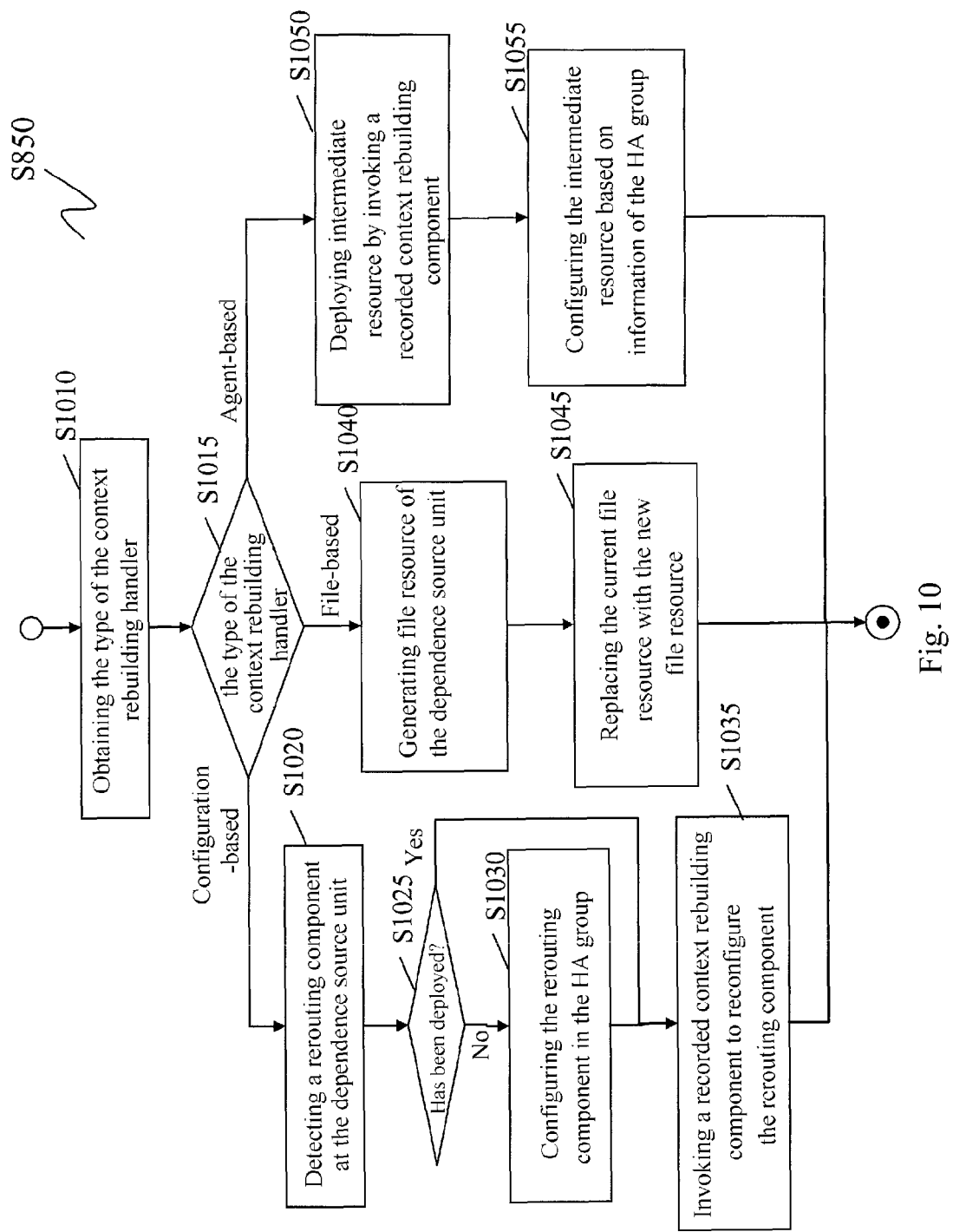
FIG. 10 is a schematic flowchart illustrating the processing for context rebuilding of the member unit in the HA group by invoking a context rebuilding program in step S850 of FIG. 8.
Figure 11:
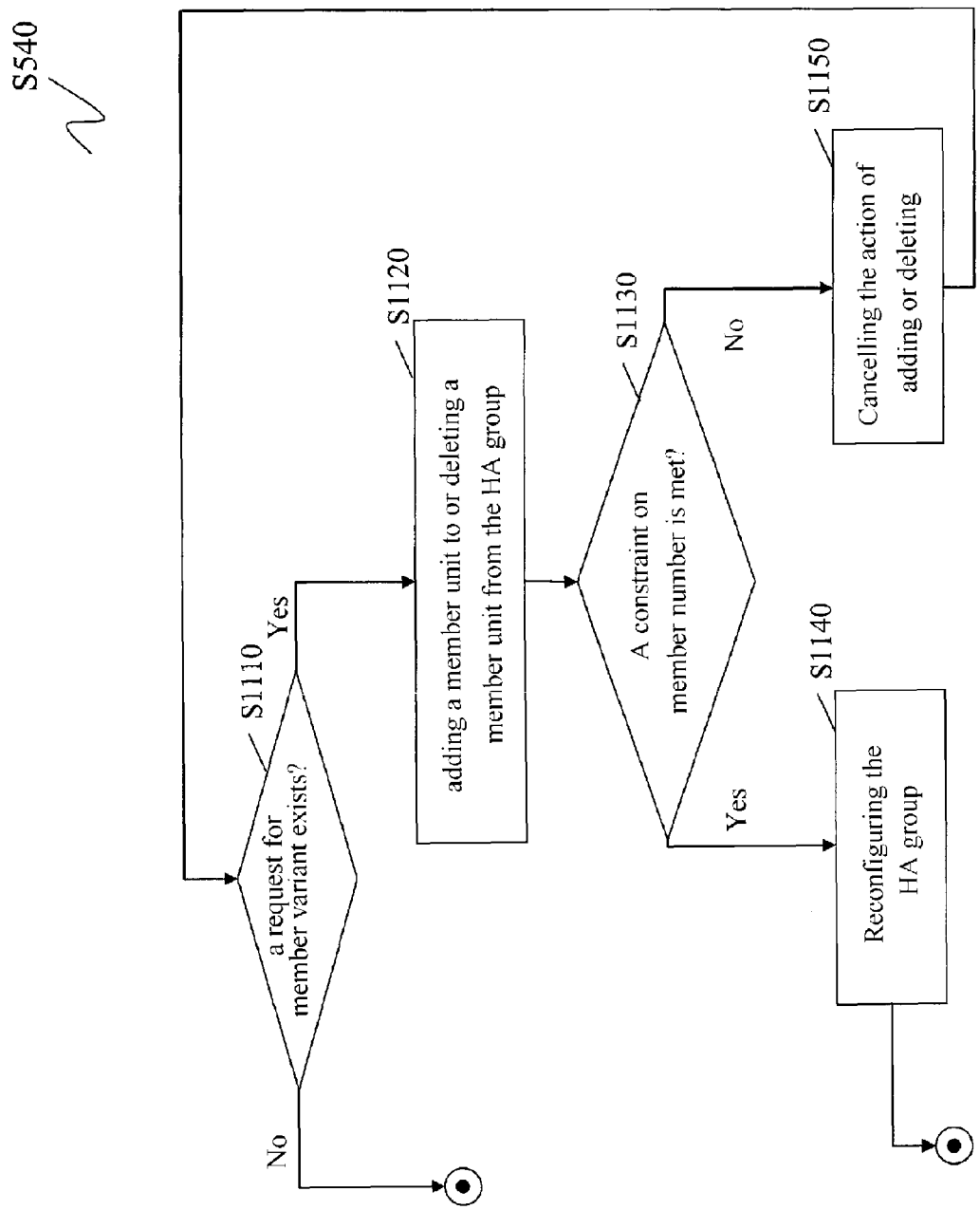
FIG. 11 is a schematic flowchart illustrating the processing for generating a member unit based HA group variant in step S540 of FIG. 5.

Detailed processes of steps S520 to S550 of FIG. 5 are described in detail hereinafter with reference to FIG. 6 to FIG. 10. FIG. 6 is a schematic flowchart of the processing for generating an initial HA group in step S520; FIG. 7 is an example of the single system views of the SSI cluster (as a WAS cluster shown in the figure) before and after performing step S650 (i.e., creating the HA capability elements) of FIG. 6; FIG. 8 is a schematic flowchart of the processing for performing context rebuilding for the member units in the HA group in step S530 of FIG. 5; FIG. 9 is a schematic diagram illustrating the process for an HA expert to author an HA pattern; FIG. 10 is a schematic flowchart of the processing for performing context rebuilding for the member units in the HA group by invoking a context rebuilding handler in step S850 of FIG. 8; and FIG. 11 is a schematic flowchart of the processing for generating an HA member unit based HA group variant in step S540 of FIG. 5.

The flowchart of FIG. 6 shows the detailed process of step S520 of FIG. 5 (i.e., generating an initial HA group). As shown in FIG. 6, it is determined in step S610 whether one or more member units in the HA group are homogenous, according to the HA pattern retrieved in step S510. If the determination of step S610 is true, a common functional capability element of the member units in the HA group is determined in step S620 (e.g., in example 1 of FIG. 4, it is determined that the common functional capability elements of all the member units include a J2EE container, a JSP container and an EJB container); otherwise, a common super-type functional capability element of the member units in the HA group is determined in step S630 (e.g., in example 2 of FIG. 4, it is determined that the common super-type functional capability element include a database).

Then, in step S640, the functional capability element determined in step S620 or step S630 is created for the HA group (i.e., the determined functional capability element is moved up to the HA group). For example, in example 1 of FIG. 4, a J2EE container, a JSP container and an EJB container are created for the WAS cluster by means of the capability move up mechanism (i.e., the J2EE container, JSP container and EJB container are moved up to the WAS cluster). In example 2 of FIG. 4, a database is created for the database failover group by means of the capability move up mechanism (i.e., the super-type capability move up mechanism), that is, database is moved up to the database failover group.

Next, in step S650, an HA capability element is created for the HA group, which may include provisioning and configuring the state or data synchronization capability element, provisioning and configuring the failure detection capability element, and provisioning and configuring the failover capability element for the HA group, so as to obtain the original HA group. For example, FIG. 7 shows an example of the single system views of the WAS cluster before and after the creating of the HA capability element.

The flowchart of FIG. 8 shows the detail process of step S530 (i.e., performing context rebuilding for the member units in the HA group) of FIG. 5. As shown in FIG. 8, in step S810, it is determined whether each of the member units in the HA group has incoming dependency (e.g., according to the model chart). Taking example 1 of FIG. 4 as an example, "dependency" refers to the relationship between each WAS application server in the WAS cluster and the outside, and "incoming" dependency refers to the outside's dependence relationship on the WAS application server.

If it is determined in step S810 that a member unit has incoming dependency, then the dependence source type of the member unit (i.e., the type of the external source unit dependent on the member unit) is obtained in step S820, and then the processing proceeds to step S840; otherwise, the processing of step S530 is ended (i.e., the context rebuilding processing does not need to be performed).

As shown in the figure, in step S830, it is determined whether the HA group is HA-transparent based on the HA pattern retrieved in step S510. If the determination is false, i.e., if it is determined that the target HA group is not HA-transparent, then the processing proceeds to step S840; otherwise, the processing of step S530 is ended (i.e., the context rebuilding processing does not need to be performed).

In the case that the software or hardware of the HA group itself provides an automatic fail take-over mechanism, no additional configurations are needed for context rebuilding when a unit is transformed into an HA group. At this time, from the perspective of an incoming dependent, the HA group is transparent, i.e., whether using an HA solution or not has no effect on the context. Normally, whether an HA pattern can provide the capability of HA transparency or not depends on the software used by the HA pattern. In other words, when the HA expert authors the HA pattern, he has made recording according to the software in use to determine whether an HA group is HA-transparent or not.

As shown in the figure, when "the HA group is not HA-transparent" and "a member unit has incoming dependency" are met, in step S840, a suitable context rebuilding handler is searched for from, for example, a handler repository for being invoked (e.g., the suitable context rebuilding handler may be searched for with reference to the tables shown in FIG. 9, according to the dependence source type).

The context rebuilding handler is a function service which sets the context of a member unit in the HA group after transformation according to the context of a unit to be transformed, so that the context would not be lost in the generation of the HA group. For example, the dependence relationship on the unit to be transformed is reconfigured to the HA group to be transformed into. Normally, the context rebuilding handler is authored by an HA expert, and is stored in a handler repository according to its type. While authoring an HA pattern, the dependence-based source unit is used to record the HA context rebuilding handler.

The context rebuilding handler may be mainly categorized into: (1) configuration-based handler; (2) file-based handler; and (3) agent-based handler. For the configuration-based context rebuilding handlers, particular configuration is required at the dependence source unit, and a special component (normally provided by the particular HA software) is usually required to be deployed to the dependence source unit. Generally, the database-specific HA solutions may involve this type of handler. For the file-based context rebuilding handlers, a particular file is to be regenerated and deployed at the dependence source unit, and a special component (which is normally the external resource) is also included (normally it is already deployed). For the agent-based context rebuilding handlers, an intermediate unit (as an agent) is needed between the dependence source unit and the HA group.

For better understanding, FIG. 9 schematically shows the process example for an HA expert to author an HA pattern. As shown in FIG. 9, to author the HA pattern, the HA expert first records a context rebuilding handler, e.g., by associating a dependence source type with the context rebuilding handler with reference to the table format shown in the figure, to form the context rebuilding component. Then, the HA expert records attributes, e.g., by storing "name", "type", "default value" and the like with reference to the table format shown in the figure, to form the attribute configuration component. In addition, the HA expert may also record a constraint. Thus, as shown in the figure, the authored HA pattern is recorded with the context rebuilding component, the attribute configuration component, the structure configuration component and the constraint.

Moreover, the handler repository may be stored separately in a different storage device from the one where the HA pattern repository is stored, for example. Alternatively, they may also be stored in the same storage device.

FIG. 8 is referred to again. In step S850, the context rebuilding handler found in step S840 is invoked. The flowchart of FIG. 10 shows the process of step S850 (invoking the context rebuilding handler) in detail.

As shown in FIG. 10, in step S1010, the type of the context rebuilding handler found in step S840 is obtained, and it is determined in step S1015 which one of the following is the type of the context rebuilding handler: configuration-based, file-based, or agent-based.

If it is determined in step S1015 that the context rebuilding handler is configuration-based, then in step S1020 a rerouting component is detected at the dependence source unit, and in step S1025 it is determined whether the rerouting component has already been deployed (i.e., whether it is deployed in the HA group). If it has not been deployed, in step S1030, the rerouting component is configured to the HA group, and the process proceeds to step S1035; otherwise, the process proceeds directly to step S1035.

In step S1035, the rerouting component is reconfigured by invoking the context rebuilding component recorded in the HA pattern.

For more information about the rerouting component, please refer to, e.g., "High Availability and Scalability Guide for DB2 on Linux, UNIX, and Windows (Redbooks)" (e.g., Chapter 5) by IBM International Technical Support Organization available at ibm.com/redbooks.

If it is determined in step S1015 that the context rebuilding handler is file-based, then in step S1040 a file resource of the dependence source unit is generated, and then in step S1045 the current file resource of the corresponding member unit in the HA single system view is replaced with the newly generated file resource.

If it is determined in step S1015 that the context rebuilding handler is agent-based, then in step S1050 an intermediate resource is deployed (to the HA group) by invoking the context rebuilding component recorded in the HA pattern, and then in step S1055 the intermediate resource is configured based on the context rebuilding handler.

In this way, after the execution of step S1035, S1045 or S1055, the process of the context rebuilding of the member units in the HA group is ended.

FIG. 11 is a schematic flowchart illustrating the specific process of step S540 (generating an HA member unit based group variant) of FIG. 5 in detail.

As shown in FIG. 11, in step S1110, it is determined whether a request for the member variant (here, only the change of the number of member units in the HA group is considered, for simplification) exists, according to the HA group redundancy set by the user (which is obtainable from the HA requirement input by the user). If not, the processing is ended, i.e., a member unit based HA group variant does not need to be generated.

If it is determined in step S1110 that that a request for the member variant exists (i.e., a request for changing the member number is determined to exist), in step S1120 a member unit is added to or deleted from the HA group, with the number of the member units added or deleted dependent on the request for changing the member number. Then, in step S1130, it is determined whether the current number of the member units in the HA group meets the constraint on the member number (which is pre-recorded in the HA pattern as shown in FIG. 9). If it is determined in step S1130 that the constraint is met, then in step S1140 the HA group is reconfigured, and the processing is ended. If it is determined in step S1130 that the constraint is not met, then in step S1150 the above action of adding or deleting the member units is cancelled and the processing returns to step S1110, to determine whether a request for member variant still exists, and to repeat the above steps S1110 to S1150 if it is determined that such a request still exists, until no request for member variant exists.

Detailed process of the method for generating an HA group according to a user's HA requirement according to an embodiment of the invention is described above with reference to FIG. 3 to FIG. 11. Those skilled in the art can easily make modifications or improvements to the process described above according to the actual requirements after reading the above description.

For example, the method 500 of FIG. 5 may further include a step of presenting the HA group to the user in the single system view (not shown), so that the user can obtain an intuitive perception of the generated HA group, facilitating the subsequent operations of the user. Moreover, during the whole execution of the method 500, the HA group may be presented to the user in the single system view, so that the user can have an intuitive perception of the HA group obtained in each of the steps of the method 500.

As a matter of course, other modifications or improvements may be made according to the actual requirements. Detailed descriptions are omitted here for clarity.

Figure 12:
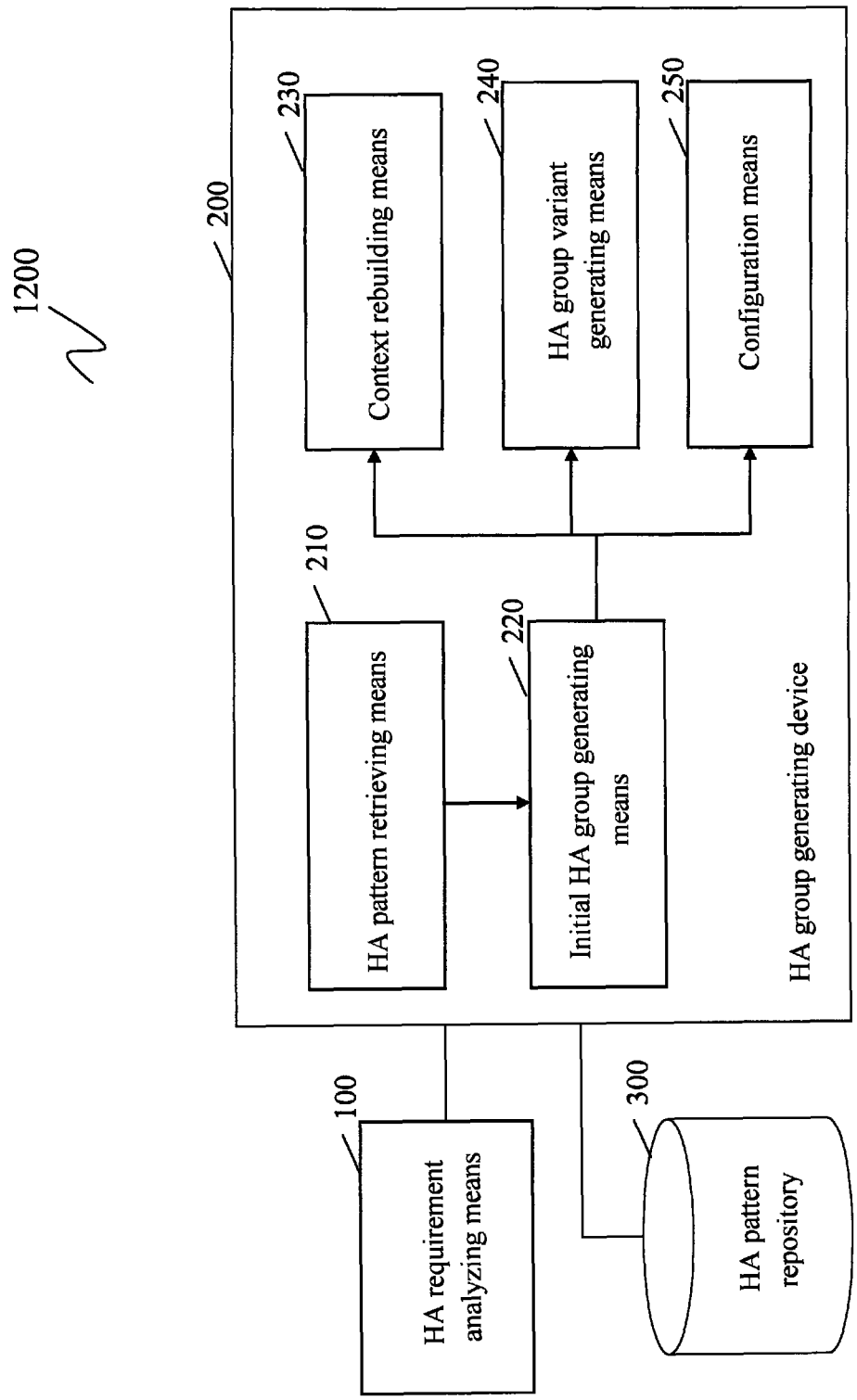
FIG. 12 is a schematic block diagram illustrating the structure of a system for generating an HA group according to a user's HA requirement according to an embodiment of the invention.

FIG. 12 is a schematic block diagram of a system 1200 for generating an HA group according to a user's HA requirement according to an embodiment of the invention.

As shown in FIG. 12, the system 1200 mainly includes an HA requirement analyzing means 100, an HA group generating device 200 and an HA pattern repository 300. The HA requirement analyzing means 100 is adapted to perform HA requirement analysis on the user's HA requirement; the HA group generating device 200 can generate an HA group according to the user's HA requirement as described above; and the HA pattern repository 300 is pre-stored with a plurality of applicable HA patterns.

As shown in the figure, the HA group generating device 200 further includes an HA pattern retrieving means 210, an initial HA group generating means 220, a context rebuilding means 230, an HA group variant generating means 240 and a configuration means 250.

The HA pattern retrieving means 210 is adapted to retrieve an applicable HA pattern from the HA pattern repository 300, according to a result of the HA requirement analysis on the user's HA requirement; the initial HA group generating means 220 is adapted to generate an initial HA group (i.e., the initial SSI cluster or the HA failover group) based on the HA pattern retrieved by the HA pattern retrieving means 210; the context rebuilding means 230 is adapted to perform context rebuilding on a member unit in the initial HA group generated by the initial HA group generating means 220, to obtain a preliminarily configured HA group; the HA group variant generating means 240 is adapted to generate a member unit based HA group variant for the preliminarily configured HA group, according to an HA group redundancy obtained from the user's HA requirement; and the configuration means 250 is adapted to perform structure configuration and attribute configuration on a member unit in the generated HA group variant, to obtain a user desired HA group that meets the user's HA requirement.

The initial HA generating means includes: a means adapted to determine whether one or more of the member units in the HA group are homogenous, according to the retrieved HA pattern; a means adapted to determine a common functional capability element of the member units in the HA group in the case that the member units are homogeneous, and to determine a common super-type functional capability element of the member units in the HA group in the case that the member units are not homogeneous; a means adapted to create the determined functional capability element for the HA group; and a means adapted to create an HA capability element comprising a state or data synchronization capability element, a failure detection capability element and a failover capability element for the HA group, to obtain the initial HA group.

The context rebuilding means includes: a means adapted to determine whether each of the member units of the HA group has incoming dependency; a means adapted to obtain a dependence source type of a member unit in the case that it is determined that the member unit has incoming dependency; a means adapted to determine whether the HA group is HA-transparent based on the retrieved HA pattern; a means adapted to search for a suitable context rebuilding handler to be invoked in the case that it is determined that the HA group is not HA-transparent and a member unit has incoming dependency; and a means adapted to invoke the found context rebuilding handler to perform the context rebuilding.

The means adapted to invoke the found context rebuilding handler to perform the context rebuilding further includes: a) a means adapted to obtain the type of the found context rebuilding handler; b) a means adapted to perform the following processing in the case that the context rebuilding handler is a configuration-based handler: detecting a rerouting component at the dependence source unit of the member unit, and determining whether the rerouting component has been deployed in the HA group; and if not, configuring the rerouting component in the HA group, and reconfiguring the rerouting component by invoking a context rebuilding component recorded in the HA pattern; c) a means adapted to perform the following processing in the case that the context rebuilding handler is a file-based handler: generating file resource of the dependence source unit, and then replacing the current file resource of the corresponding member unit in the HA group with the newly generated file resource; and d) a means adapted to perform the following processing in the case that the context rebuilding handler is an agent-based handler: deploying intermediate resource in the HA group by invoking a context rebuilding component recorded in the HA pattern, and then configuring the intermediate resource based on the context rebuilding handler.

As the implementation of the function of each of the above means has already been described with reference to the flowcharts, the implementation of these functions of each means is omitted here.

As easily can be seen from the above description, by using the method, the device and/or the system for generating an HA group according to a user's HA requirement discussed above, the complexity of HA group configuration can be reduced, and the design, plan and configuration of the HA group are automated, thereby facilitating the cost lowering.

In addition, with the method, the device and/or the system for generating an HA group according to a user's HA requirement discussed above, as the complexity of the HA group configuration is reduced, the IT technicians are no longer required to have advanced HA professional skills, thereby lowering the professional skill requirement for the technicians, which helps to lower cost.

Furthermore, as a matter of course, each of the operation processes of the above method according to the invention may be implemented in the format of computer-executable programs stored in all kinds of machine-readable storage medium.

Moreover, the object of the invention may also be realized in the following manner: providing the storage medium stored with the executable program code to a system or device, directly or indirectly; and a computer or a Central Processing Unit (CPU) in the system or device reading and executing the above mentioned program code.

Then, as long as the system or device can execute programs, the embodiments of the invention are not confined to programs, and the programs may take any form, e.g., target programs, interpreter-executable programs, or scripts provided to an operating systems, and the like.

The above machine-readable storage medium includes but is not limited to: all kinds of storage and storage unit, semiconductor device, disk unit such as optical disc, magnetic disk and magneto-optical disk, and any other medium that is suitable for storing information.

In addition, the invention may also be implemented with a computer connecting to a corresponding website in the Internet, downloading and installing the computer program code in computer memory, and executing the program.

Figure 13:
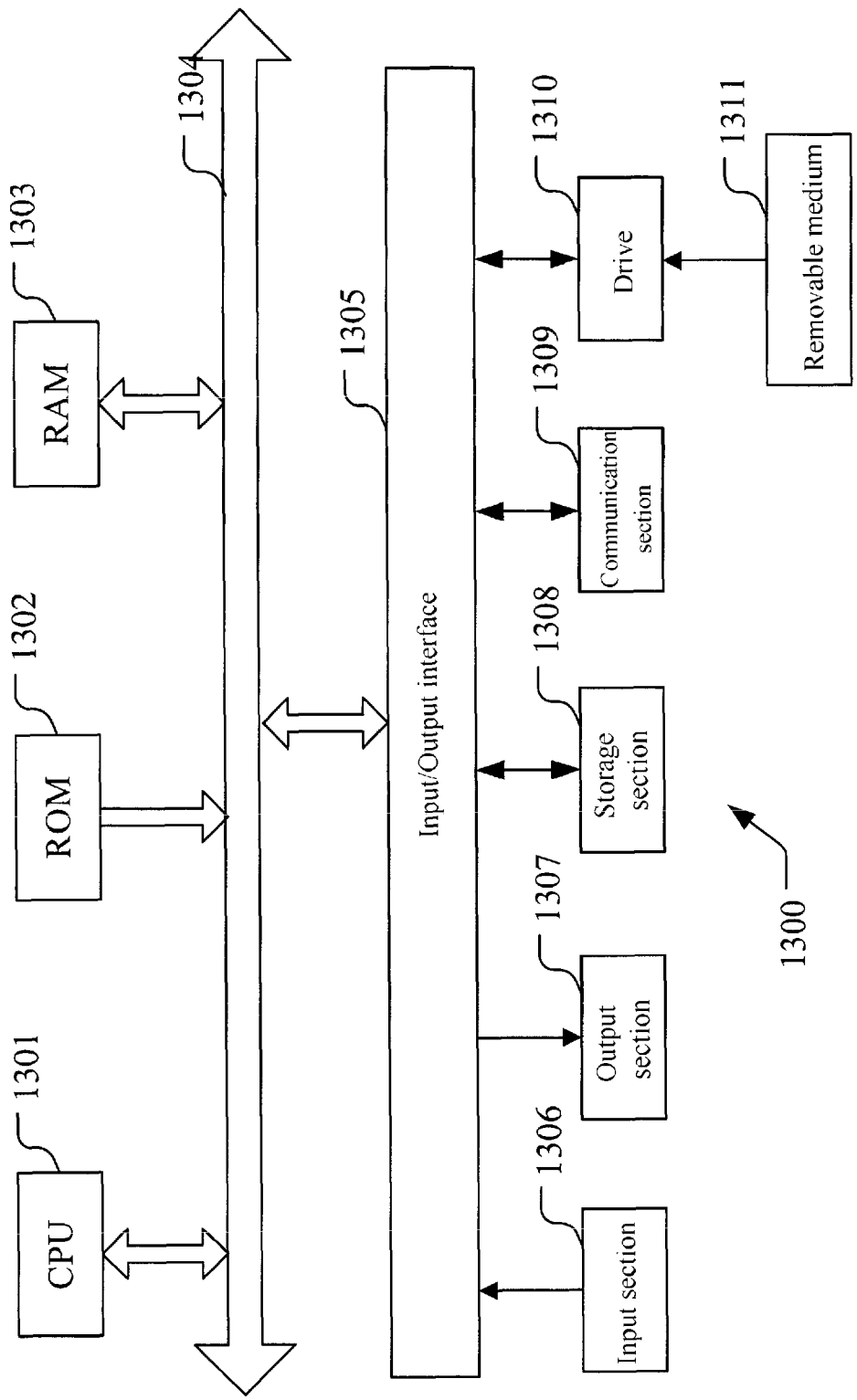
FIG. 13 is a schematic block diagram illustrating an exemplary structure of a general-purpose personal computer in which the embodiments of the invention can be implemented.

FIG. 13 is a schematic block diagram illustrating an exemplary structure of a general-purpose personal computer 1300 in which the invention can be implemented.

As shown in FIG. 13, a Central Processing Unit (CPU) 1301 performs various processes based on the program stored in a Read Only Memory (ROM) 1302 or the program loaded from a storage section 1308 to a Random Access Memory (RAM) 1303. In the RAM 1303, data that are necessary for the CPU 1301 to perform various processes or the like may also be stored when needed.

The CPU 1301, the ROM 1302, and the RAM 1303 are connected to one another via a bus 1304. An input/output interface 1305 is also connected to the bus 1304.

The input/output interface 1305 is connected with the following components: an input section 1306, including a keyboard, a mouse and the like; an output section 1307, including a display such as a Cathode Ray Tube (CRT), a Liquid Crystal Display (LCD) and the like, and a loudspeaker and the like; the storage section 1308, including a hard disk and the like; and a communication section 1309, including a network interface card such as a LAN card, a modem and the like. The communication section 1309 performs communication processes via a network such as the Internet.

A drive 1310 may also be connected to the input/output interface 1305 as needed. A removable medium 1311, such as magnetic disk, optical disk, magneto-optical disk, semiconductor memory and the like, is loaded on the drive 1310 as needed, so that the computer programs read therefrom may be installed to the storage section 1308 as needed.

In the case that the above-described series of processes are implemented with software, the program that constitutes the software may be installed to the computer storage location from a network such as the Internet or a storage medium such as the removable medium 1311.

Those skilled in the art would appreciate that, the storage medium is not limited to the removable medium 1311 having the program stored therein as illustrated in FIG. 13, which is delivered separately from the device for providing the program to the user. Examples of the removable medium 1311 include a magnetic disk (including a floppy disk (registered trademark)), an optical disk (including a Compact Disk-Read Only Memory (CD-ROM) and a Digital Versatile Disk (DVD)), a magneto-optical disk (including a Mini-Disk (MD) (registered trademark)), and a semiconductor memory.

Alternatively, the storage medium may be the ROM 1302, the hard disk contained in the storage section 1308, and the like, which has the program stored therein and is delivered to the user together with the device that contains them.

It should also be noted that, the steps performing the above-described series of processes may, but not necessarily, be performed chronologically in the natural order of the description. Some steps may be performed in parallel or independently of one another.

Moreover, the terms "comprise", "comprising," "include" or any other variations thereof, are intended to cover a non-exclusive inclusion in this application, so that a process, method, article, or device that comprises a list of elements does not only include these elements but also may include other elements not explicitly listed or elements inherent to such process, method, article, or device. An element preceded by "a" or "an" does not, if without more constraints, preclude the existence of additional identical elements in the process, method, article, or device that comprises the element.

Embodiments of the invention are described above in conjunction with the figures. However, it should be understood that the embodiments described therein are merely for the purpose of illustration, and do not limit the scope of the invention. Those skilled in the art can make various modifications and alternations to the above embodiments without departing from the essential and scope of the invention. Therefore, the scope of the invention is defined only by the appended claims and the equivalents thereof.

The invention claimed is

1. A method for a computer system having at least one processing device for generating a High Availability (HA) group according to a user's HA requirement, comprising the steps of:
    retrieving an applicable HA pattern, according to a result of HA requirement analysis on the user's HA requirement;
    generating an initial HA group based on the retrieved HA pattern;
    performing context rebuilding on a member unit in the initial HA group, to obtain a preliminarily configured HA group;
    generating a member unit based HA group variant for the preliminarily configured HA group, according to an HA group redundancy obtainable from the user's HA requirement; and
    performing structure configuration and attribute configuration on a member unit in the generated HA group variant, to obtain an HA group that meets the user's HA requirement.

2. The method according to claim 1, wherein the generating of an initial HA group comprises:
    determining whether one or more of the member units in the HA group are homogenous, according to the retrieved HA pattern;
    if the member units are homogeneous, then determining a common functional capability element of the member units in the HA group; otherwise, determining a common super-type functional capability element of the member units in the HA group;
    creating the determined functional capability element for the HA group; and
    creating an HA capability element for the HA group to obtain the initial HA group, wherein the HA capability element comprises a state or data synchronization capability element, a failure detection capability element and a failover capability element.

3. The method according to claim 2, wherein the creating of HA capability elements for the HA group comprises: provisioning and configuring the state or data synchronization capability element, provisioning and configuring the failure detection capability element, and provisioning and configuring the failover capability element for the HA group.

4. The method according to claim 1, wherein the performing of context rebuilding on member units in the initial HA group comprises:
    determining whether each of the member units of the HA group has incoming dependency;
    if it is determined that a member unit has incoming dependency, then obtaining a dependence source type of the member unit; otherwise ending the processing of context rebuilding;
    determining whether the HA group is HA-transparent based on the retrieved HA pattern;
    if it is determined that the HA group is HA-transparent, then ending the processing of context rebuilding; otherwise searching for a suitable context rebuilding handler to be invoked; and
    invoking the found context rebuilding handler to perform the context rebuilding of the member units in the HA group.

5. The method according to claim 4, wherein the invoking of the found context rebuilding handler to perform the context rebuilding of the member units in the HA group comprises:
    obtaining a type of the found context rebuilding handler;
    if the context rebuilding handler is configuration-based, then detecting a rerouting component at the dependence source unit of the member unit, and determining whether the rerouting component is deployed in the HA group; and if the rerouting component is not deployed in the HA group, configuring the rerouting component in the HA group, and reconfiguring the rerouting component by invoking a context rebuilding component written in the HA pattern;
    if the context rebuilding handler is file-based, then generating file resource of the dependence source unit, and replacing the current file resource of the corresponding member unit in the HA group with the newly generated file resource; and
    if the context rebuilding handler is agent-based, then deploying intermediate resource in the HA group by invoking a context rebuilding component recorded in the HA pattern, and configuring the intermediate resource based on the context rebuilding handler.

6. The method according to claim 4 wherein the suitable context rebuilding handler is found in a handler repository where a plurality of context rebuilding handlers are pre-stored.

7. The method according to claim 1, wherein the generating of a member unit based HA group variant comprises:
    a) in the case that it is determined that a request for changing a member number exists according to the user's HA requirement, adding a member unit to or deleting a member unit from the HA group, wherein the number of member units added or deleted is dependent on the request for changing the member number;
    b) determining whether the current number of member units in the HA group meets a constraint on the member number;
    c) if it is determined that the constraint is met, then reconfiguring the HA group; and
    d) if it is determined that the constraint is not met, then cancelling the action of adding or deleting of a member unit, and determining whether a request for changing the member number still exists, and repeating the steps above a) to d) when it is determined that a request for changing the member number still exists, until no request for changing the member number exists.

8. The method according to claim 1 further comprising: presenting the HA group to the user in a single system view.

9. The method according to claim 1, wherein the applicable HA pattern is retrieved from an HA pattern repository where a plurality of HA patterns are pre-stored.

10. The method according to claim 1, wherein the structure configuration and attribute configuration of the member units in the HA group is implemented with a structure configuration component and an attribute configuration component recorded in the HA pattern.

11. A device for generating an HA group according to a user's HA requirement, comprising:
at least one processing device for executing components;
an HA pattern retrieving component, adapted to retrieve an applicable HA pattern, according to a result of HA requirement analysis on the user's HA requirement;
an initial HA group generating component, adapted to generate an initial HA group based on the HA pattern retrieved by the HA pattern retrieving component;
a context rebuilding component, adapted to perform context rebuilding on a member unit in the initial HA group, to obtain a preliminarily configured HA group;
an HA group variant generating component, adapted to generate a member unit based HA group variant for the preliminarily configured HA group, according to an HA group redundancy obtainable from the user's HA requirement; and
a configuration component, adapted to perform structure configuration and attribute configuration on a member unit in the generated HA group variant, to obtain an HA group that meets the user's HA requirement.

12. The device according to claim 11, wherein the initial HA generating component comprises:
a first determining component adapted to determine whether one or more of the member units in the HA group are homogenous, according to the retrieved HA pattern;
a second determining component adapted to determine a common functional capability element of the member units in the HA group in the case that the member units are homogeneous, and to determine a common supertype functional capability element of the member units in the HA group in the case that the member units are not homogeneous;
a functional capability element creating component adapted to create the determined functional capability element for the HA group; and
an element creating component adapted to create an HA capability element comprising a state or data synchronization capability element, a failure detection capability element and a failover capability element for the HA group, to obtain the initial HA group.

13. The device according to claim 11, wherein the context rebuilding component comprises:

a dependency determining component adapted to determine whether each of the member units of the HA group has incoming dependency;
a source type component adapted to obtain a dependence source type of a member unit if it is determined that the member unit has incoming dependency;
a transparency determining component adapted to determine whether the HA group is HA-transparent based on the retrieved HA pattern;
a search component adapted to search for a suitable context rebuilding handler to be invoked in the case that it is determined that the HA group is not HA-transparent and a member unit has incoming dependency; and
a handler component adapted to invoke the found context rebuilding handler to perform the context rebuilding.

14. The device according to claim 13, wherein the handler component adapted to invoke the found context rebuilding handler to perform the context rebuilding comprises:
a type component adapted to obtain a type of the found context rebuilding handler;
a configuration processing component adapted to perform the following processing in the case that the context rebuilding handler is a configuration-based handler: detecting a rerouting component at the dependence source unit of the member unit, and determining whether the rerouting component has been deployed in the HA group; and if the rerouting component has not been deployed in the HA group, configuring the rerouting component in the HA group, and then reconfiguring the rerouting component by invoking a context rebuilding component recorded in the HA pattern;
a file processing component adapted to perform the following processing in the case that the context rebuilding handler is a file-based handler: generating file resource of the dependence source unit, and replacing the current file resource of the corresponding member unit in the HA group with the newly generated file resource; and
an agent processing component adapted to perform the following processing in the case that the context rebuilding handler is an agent-based handler: deploying intermediate resource in the HA group by invoking a context rebuilding component recorded in the HA pattern, and then configuring the intermediate resource based on the context rebuilding handler.

15. A system for generating an HA group according to a user's HA requirement, comprising:
at least one processing device for executing components;
an HA requirement analyzing component, adapted to perform HA requirement analysis on the user's HA requirement;
the device according to claim 10; and
an HA pattern repository where a plurality of applicable HA patterns are pre-stored.

* * * * *